Figure 1:
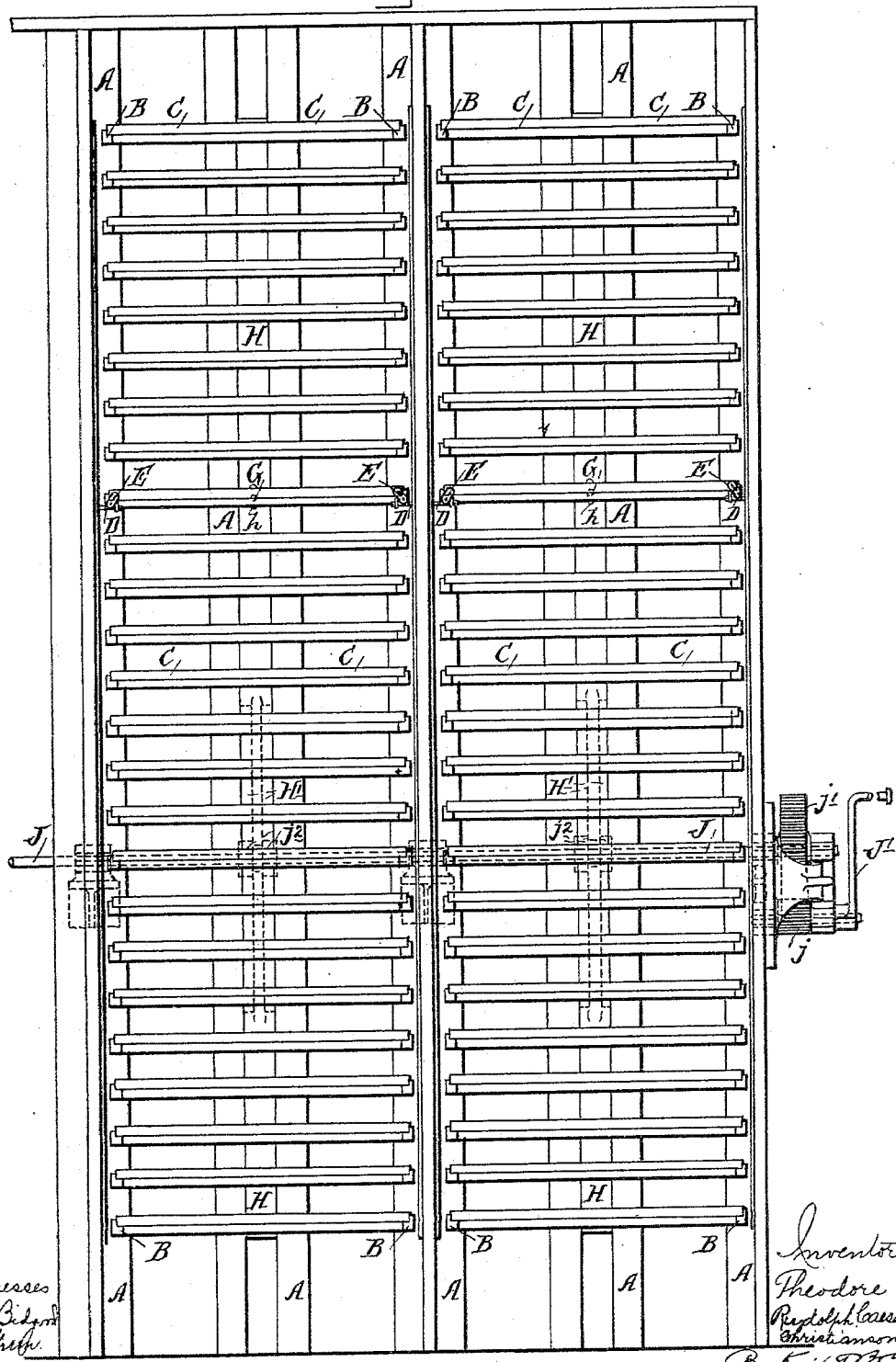

(No Model.) 4 Sheets—Sheet 1.

T. R. C. CHRISTIANSON.
STORING EGGS AND APPARATUS FOR TURNING THEM TO KEEP THEM FRESH.

No. 559,676. Patented May 5, 1896.

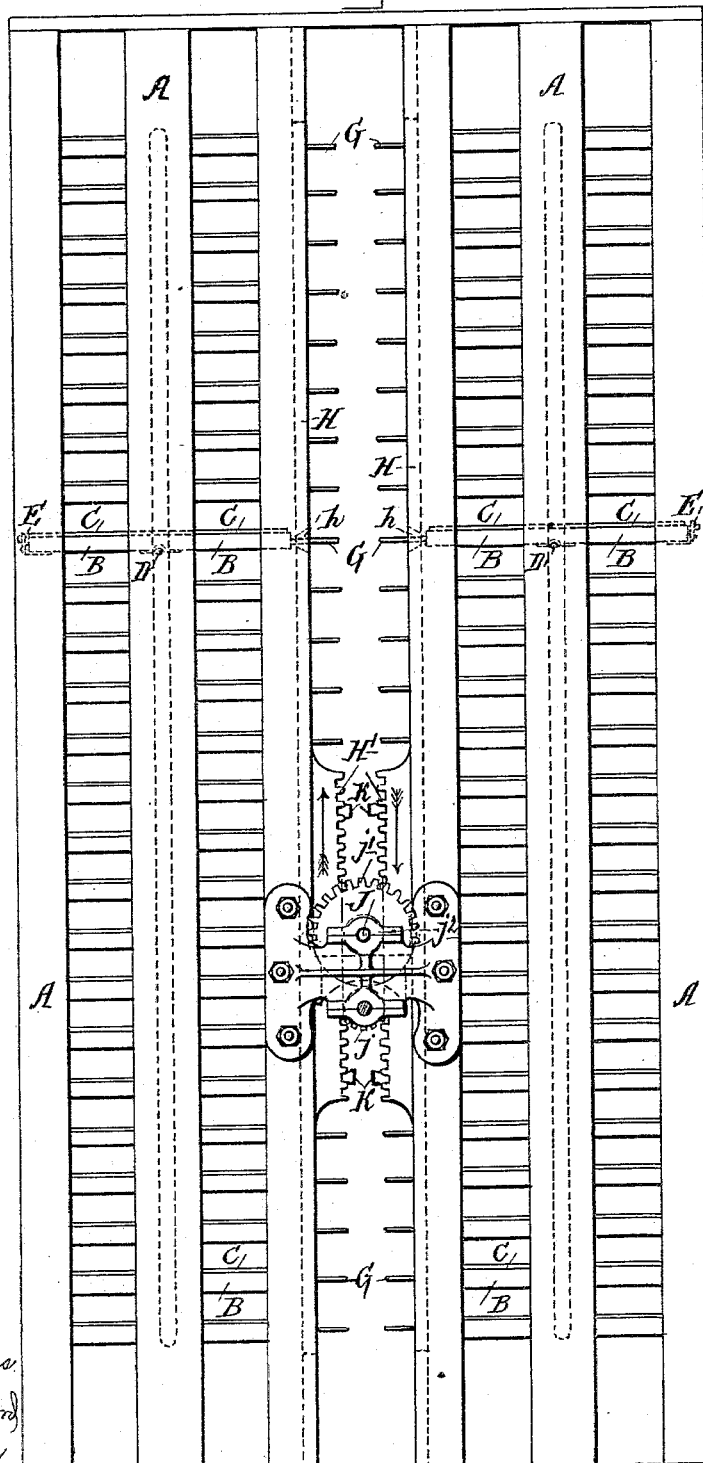

(No Model.) 4 Sheets—Sheet 3.
T. R. C. CHRISTIANSON.
STORING EGGS AND APPARATUS FOR TURNING THEM TO KEEP THEM FRESH.
No. 559,676. Patented May 5, 1896.
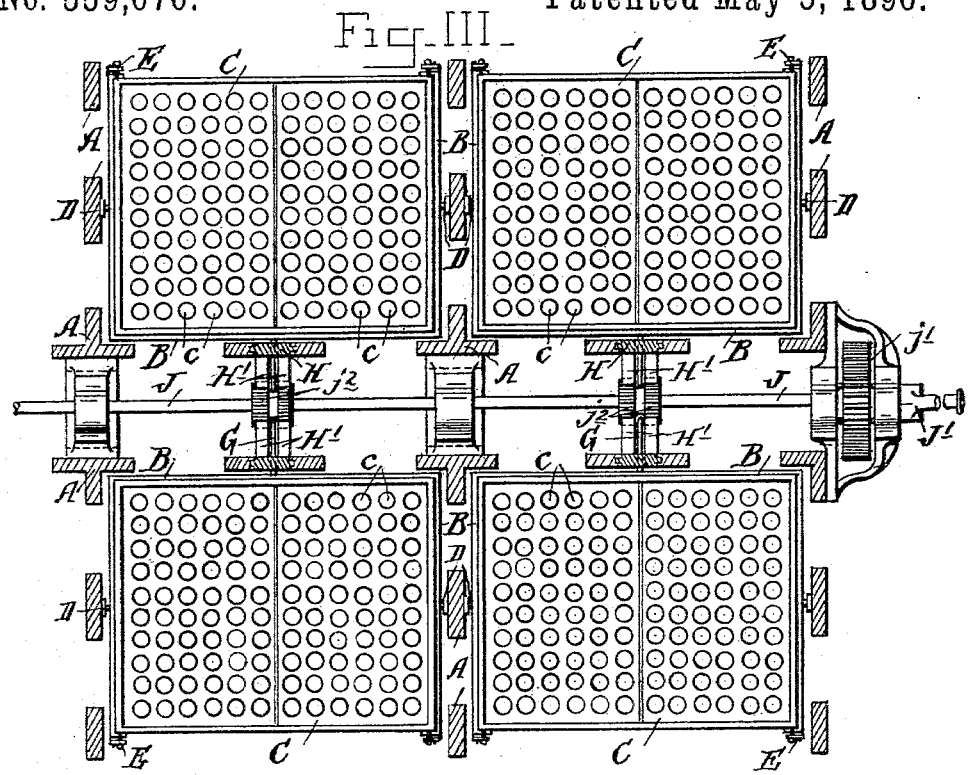
Fig. III.
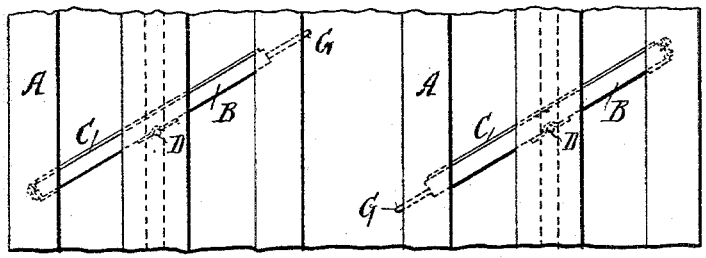
Fig. IV.
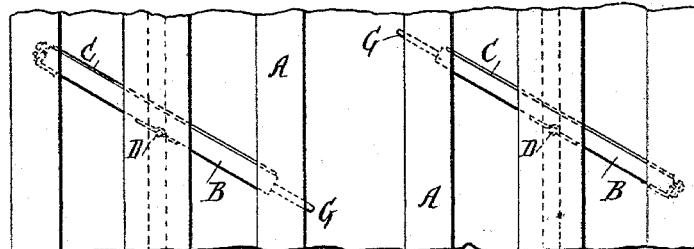
Fig. V.
Witnesses:
M. V. Bidgood
J. Green
Inventor
Theodore Rudolph
Caesar Christianson
By Knight Bros
Attys.
ANDREW B.GRAHAM. PHOTO-LITHO. WASHINGTON,D.C.

(No Model.)
T. R. C. CHRISTIANSON.
STORING EGGS AND APPARATUS FOR TURNING THEM TO KEEP THEM FRESH.
No. 559,676. Patented May 5, 1896.
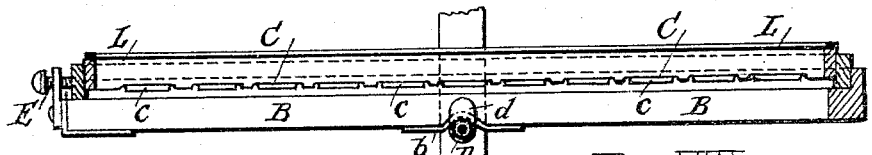
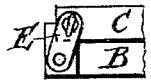
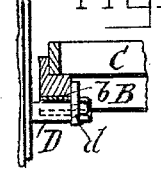
Witnesses
M. V. Bidgood
J. Green
Inventor,
Theodore Rudolph
Caesar Christianson
By Smith
Attys.

UNITED STATES PATENT OFFICE.

THEODORE RUDOLPH CÆSAR CHRISTIANSON, OF LEITH, SCOTLAND.

STORING EGGS AND APPARATUS FOR TURNING THEM TO KEEP THEM FRESH.

SPECIFICATION forming part of Letters Patent No. 559,676, dated May 5, 1896.

Application filed April 4, 1895. Serial No. 544,423. (No model.) Patented in England November 2, 1894, No. 21,035.

*To all whom it may concern:*

Be it known that I, THEODORE RUDOLPH CÆSAR CHRISTIANSON, a subject of the Queen of Great Britain, residing at Quality Lane, Leith, Scotland, have invented certain new and useful Improvements in Apparatus for Storing and Preserving Eggs, (for which a patent has been granted in England, No. 21,035, dated November 2, 1894;) and I do hereby declare that the following specification, taken in connection with the accompanying drawings, which form a part thereof, is a full, clear, and exact description of my improvements, such as will enable those skilled in the art to make and use the same.

My invention relates to improvements in the class of egg storing and preserving apparatus comprising, essentially, a pivotally-supported tray adapted to receive the eggs, and means for tilting the tray out of a horizontal for changing the position of the eggs and preventing the yolks becoming attached to the shells.

My invention relates particularly to the details of construction, the novel features of which will first be described with reference to the accompanying drawings, and afterward more particularly pointed out in the annexed claims.

In said drawings, Figure I is a front elevation of my improved egg-preserving device. Fig. II is a side elevation of the same. Fig. III is a sectional plan view of same. Figs. IV and V are enlarged detail side elevations representing the two tilted positions of the trays. Fig. VI is an enlarged detail sectional view representing the means for pivotally supporting the frames carrying the egg-trays. Fig. VII is an enlarged detail view of the catch for securing the trays in the pivoted frames. Fig. VIII is an enlarged detail sectional elevation showing one of the pivot-supports.

A is an upright framework, of wood or any other suitable material.

B are a series of small rectangular frames pivotally supported in framework A upon the stationary pins D, and confined upon the pins by the removable head-plates, which are held in place by small bolts $d$. The pins D work in metal bearings $b$, secured to the frames B.

C are the egg-trays, formed, preferably, with individual openings to receive the eggs. The trays C are adapted to rest upon the pivoted frames B and be confined or clamped in place by means of the screw-clamps E, mounted upon frame B, preferably two for each frame.

G is a pin or rod secured to each of the frames B and passing through one of the holes or slots $h$, formed in a longitudinally-movable vertical bar H, supported in suitable bearings in the upright framework. The holes or slots $h$ are expanded or enlarged in vertical width from the inner face, adjacent to the frames B, toward the other face of the bar in both bars in order to allow for the free movement of the frames and the bars.

H' are rack-bars attached to the bars H, placed to face each other, and journaled between them is a cross-shaft J, carrying pinions $j^2$, which mesh with the rack-bars and move them in opposite directions for tilting the frame B when the shaft J is rotated by handle J' through gearing $j'$.

I prefer to arrange the pivoted frames B in two, four, six, or more series, as shown, geared together to operate in pairs from a common operating-shaft, and it is the intention to keep the apparatus in a cool place—say from 38° to 40° Fahrenheit—and the eggs freely exposed to the air in order to keep them cool and fresh.

The eggs are placed in the holes $c$ of the trays C with their points downward, and at the proper intervals the gearing is operated to actuate the racks H'. When moved in the direction of the arrows, Fig. II, the trays C carrying the eggs would be tilted into the position shown in Fig. IV, and if actuated in the reverse direction the trays would be tilted to the position shown in Fig. V, thus enabling the position of the yolk in the albumen of the egg to be changed when desired, so as to insure that the yolk is always embedded in the albumen and will not adhere to the shell.

The trays C and supports B may be tilted to any desired angle, though I prefer to employ limiting stops or studs K on the racks H', so as to prevent the trays being tilted too far. Also, if desired, I may provide the trays C with netting or other covers L, Fig. VII, so as to prevent the eggs from falling should the apparatus be jerked; but the movement in tilting the trays being so uniform, gentle, and slow, it is, under ordinary circumstances, impossible for a sudden jerk to take place, the whole thus forming an apparatus in which eggs may be stored and in which eggs are mechanically turned from time to time, as desired, so as to alter the position of their yolks, and at the same time the air being permitted to pass freely through the apparatus and around the eggs, whereby the eggs are kept fresh for a long time.

Having thus described my invention, the following is what I claim as new therein and desire to secure by Letters Patent:

1. In an apparatus, for storing and preserving eggs, the combination of a suitable support, the frames pivotally mounted in the support, a longitudinally-movable bar formed with holes or slots, pins or rods projecting from the pivoted frames and engaging in said holes or slots, and means for moving said bar longitudinally for tipping the frames on their pivots; the holes or slots in the bar being expanded or increased in vertical width from the inner face adjacent to the pivoted frames toward the outer face of the bar, to allow for the free movement of the pins or rods, substantially as set forth.

2. In an apparatus for storing and preserving eggs, the combination of a suitable supporting-framework, a series of small frames pivotally mounted in said framework, the egg-trays supported upon the pivoted frames, suitable fastening devices for securing the trays in place on the pivoted frames, and suitable means for tilting the pivoted frames, substantially as set forth.

3. In an apparatus for storing and preserving eggs, the combination of a suitable supporting-framework, pairs of inwardly-projecting pins on the framework, the small frame provided with suitable bearings resting upon said pins for pivotally supporting the frames, means for confining the frames on said pivot-pins, the egg-trays supported upon the pivoted frames, and clamping devices carried by the frames adapted to engage the trays and hold them securely in place, substantially as set forth.

4. In an apparatus for storing and preserving eggs, the combination of a suitable supporting-framework, a series of small frames pivoted therein, pins or rods projecting from the pivoted frames, a longitudinally-movable rod formed with holes or slots in which said pins or rods engage, a rack on said bar, a pinion engaging said rack, and means for operating said pinion, substantially as set forth.

5. In an apparatus for storing and preserving eggs, the combination of a suitable supporting-framework, a series of small frames pivotally mounted in said framework and having pins or rods projecting from them, a longitudinally-movable bar having holes or slots in which said pins or rods engage, a rack H' carried by said bar, stops K formed on said rack, and a pinion meshing with said rack for operating the bar longitudinally, substantially as set forth.

6. In an apparatus for storing and preserving eggs, the combination of a suitable supporting-framework, two vertical series of small frames individually pivoted in parallel planes in said framework, pins or rods G projecting inwardly from the pivoted frames, the vertical parallel bars H formed with holes or slots $h$ in which said pins or rods engage, racks H' carried by bars H, the pinions meshing with said racks, and a handle J geared to the pinions for operating them.

THEODORE RUDOLPH CÆSAR CHRISTIANSON.

Witnesses:
CHARLES ALEXANDER CHRISTIANSON.
JANET GIBSON.